United States Patent [19]

Dhyanchand

[11] Patent Number: 5,057,808
[45] Date of Patent: Oct. 15, 1991

[54] TRANSFORMER WITH VOLTAGE BALANCING TERTIARY WINDING

[75] Inventor: P. John Dhyanchand, Rockford, Ill.

[73] Assignee: Sundstrand Corporation, Rockford, Ill.

[21] Appl. No.: 457,944

[22] Filed: Dec. 27, 1989

[51] Int. Cl.⁵ .............................................. H01F 33/00
[52] U.S. Cl. ......................................... 336/12; 363/43
[58] Field of Search .................... 363/43, 72; 323/361; 336/5, 10, 12

[56] References Cited

U.S. PATENT DOCUMENTS

| 963,132 | 7/1910 | Frank | 336/12 |
|---|---|---|---|
| 1,173,094 | 2/1916 | Blume | 336/12 |
| 1,812,949 | 7/1931 | Halperin et al. | 336/12 |
| 2,779,926 | 1/1957 | Johnson et al. | 336/15 |
| 3,246,267 | 4/1966 | Wesolowski et al. | 336/5 X |
| 3,611,224 | 10/1971 | Becker | 336/5 |
| 3,775,662 | 11/1973 | Compoly et al. | 363/43 |

Primary Examiner—Thomas J. Kozma
Attorney, Agent, or Firm—Marshall, O'Toole, Gerstein, Murray & Bicknell

[57] ABSTRACT

A summing transformer includes first and second sets of primary windings, first and second sets of secondary windings inductively linked with the first and second sets of primary windings and a set of tertiary windings inductively linked with one of the first and second sets of secondary windings wherein the tertiary windigs are connected together and permit zero sequence currents to flow during a period of unbalanced load currents in the sets of secondary windings whereby the output voltages produced thereby are maintained in a substantially balanced condition during such period.

9 Claims, 3 Drawing Sheets

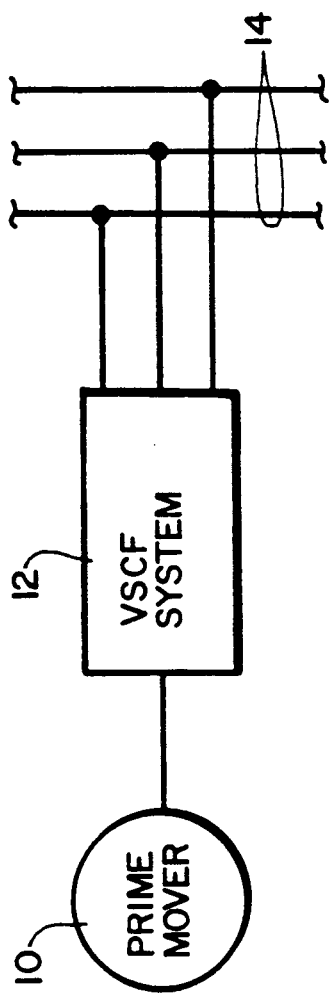
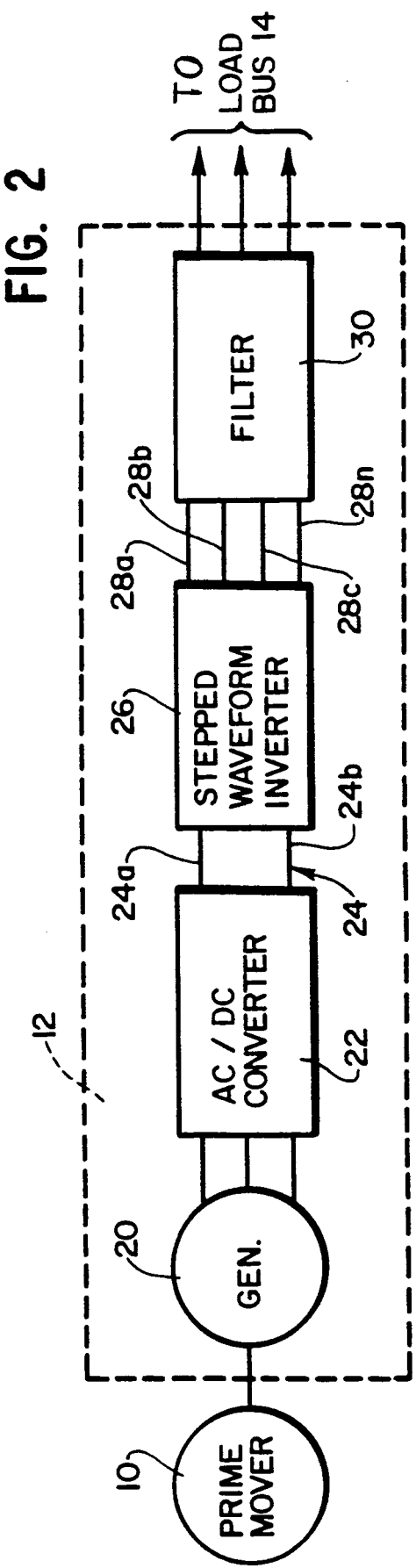

TRANSFORMER WITH VOLTAGE BALANCING TERTIARY WINDING

TECHNICAL FIELD

The present invention relates generally to transformer construction, and more particularly to a polyphase transformer for use in a power generating system.

BACKGROUND ART

Variable speed, constant-frequency power generating systems are often used to convert variable-speed motive power produced by a prime mover into constant-frequency AC power. Typically, such systems include a brushless, synchronous generator which converts the variable-speed motive power into variable-frequency electrical power, a rectifier which converts the variable-frequency electrical power into DC power and a polyphase inverter which converts the DC power into the constant-frequency AC power. The inverter may be of the stepped-waveform type wherein a series of polyphase subinverters are interconnected by a summing transformer which in turn produces polyphase stepped-waveforms each approximating a sinusoidal output.

Occasionally, an unbalanced condition can arise in loads connected to the inverter output. This, in turn can cause the output voltage magnitudes of the summing transformer to become unbalanced or substantially unequal. Such a condition is undesirable where output voltage magnitudes must be held within a certain range of a specified level.

A 24-step waveform inverter having a summing transformer which sums the outputs of four subinverters is disclosed in Compoly et al., U.S. Pat. No. 3,775,662.

A voltage balancing circuit for a polyphase inverter is disclosed in Mehl, co-pending application Ser. No. 607,811, filed Nov. 1, 1990 entitled "Voltage Balancing Circuit" and assigned to the assignee of the instant application. The voltage balancing circuit includes a pair of supplemental inverters producing supplemental AC power which is combined with the output power on two of three output phases of the inverter so that all of the phase voltage magnitudes are maintained within a range of voltage magnitudes.

SUMMARY OF THE INVENTION

In accordance with the present invention, the outputs of a stepped a waveform inverter are balanced in a simple and inexpensive fashion.

More particularly, a summing transformer includes first and second sets of primary windings and first and second sets of N secondary windings inductively linked with the first and second sets of primary windings, respectively. Each winding of the second set of N secondary windings is coupled in series with a corresponding winding of the first set of secondary windings to form N series-connected pairs or groupings of secondary windings across which N output voltages are produced. A set of N tertiary windings are inductively linked with one of the first and second sets of N secondary windings. The tertiary windings are connected together in a delta configuration and allow zero sequence current to flow during a period of unbalanced load currents in the N series-connected pairs of secondary windings whereby the output voltages are maintained in a substantially balanced condition during such period.

The transformer of the present invention does not require the use of active balancing circuits under most operating conditions.

BRIEF DESCRIPTION OF THE DRAWINGS

FIG. 1 is a block diagram of a prime mover in conjunction with a variable-speed, constant-frequency (VSCF) power conversion system;

FIG. 2 is a block diagram illustrating the VSCF system of FIG. 1 in greater detail.

DESCRIPTION OF THE PREFERRED EMBODIMENT

Figure 3A:
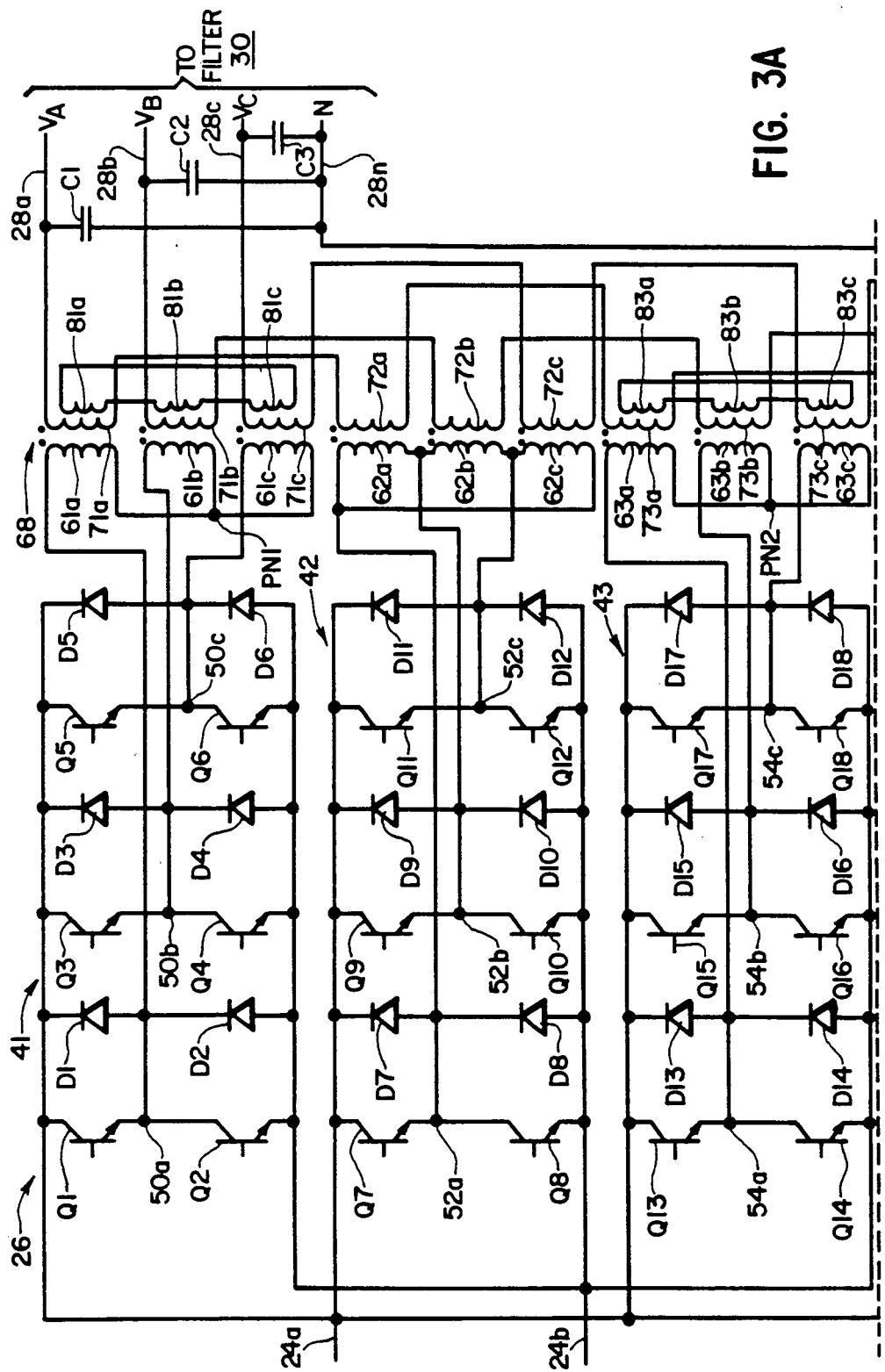
FIGS. 3A and 3B when joined at the dashed lines, together comprise a simplified schematic diagram of the stepped waveform inverter of FIG. 2 including the summing transformer of the present invention.

Referring now to FIG. 1, a prime mover 10, such as an aircraft jet engine, develops variable-speed motive power which is converted by a VSCF system 12 into constant-frequency AC electrical power on a load bus 14. It should be noted that various contactors for connecting the VSCF system 12 to the load bus 14 are not shown for the sake of simplicity.

Referring now to FIG. 2, the VSCF system 12 includes a brushless, synchronous generator 20 which converts the variable-speed motive power produced by the prime mover 10 into variable-frequency power. An AC/DC converter 22 which may be, for example, a rectifier bridge of conventional design, converts the variable-frequency power into DC power on a DC link 24 comprising first and second DC link conductors 24a, 24b. The conductors 24a, 24b are coupled to a DC/AC converter 26 which may be a three-phase stepped-waveform inverter which produces three-phase output voltages and a neutral voltage on a set of output lines 28a–28c and 28n. The output lines 28a–28c and 28n are coupled to an optional filter 30 which is in turn coupled to the load bus 14. The VSCF system 12 further includes regulation circuitry (not shown) for regulating the output of the inverter 26. Such circuitry forms no part of the present invention, and hence will not be described in greater detail herein.

Figure 3B:
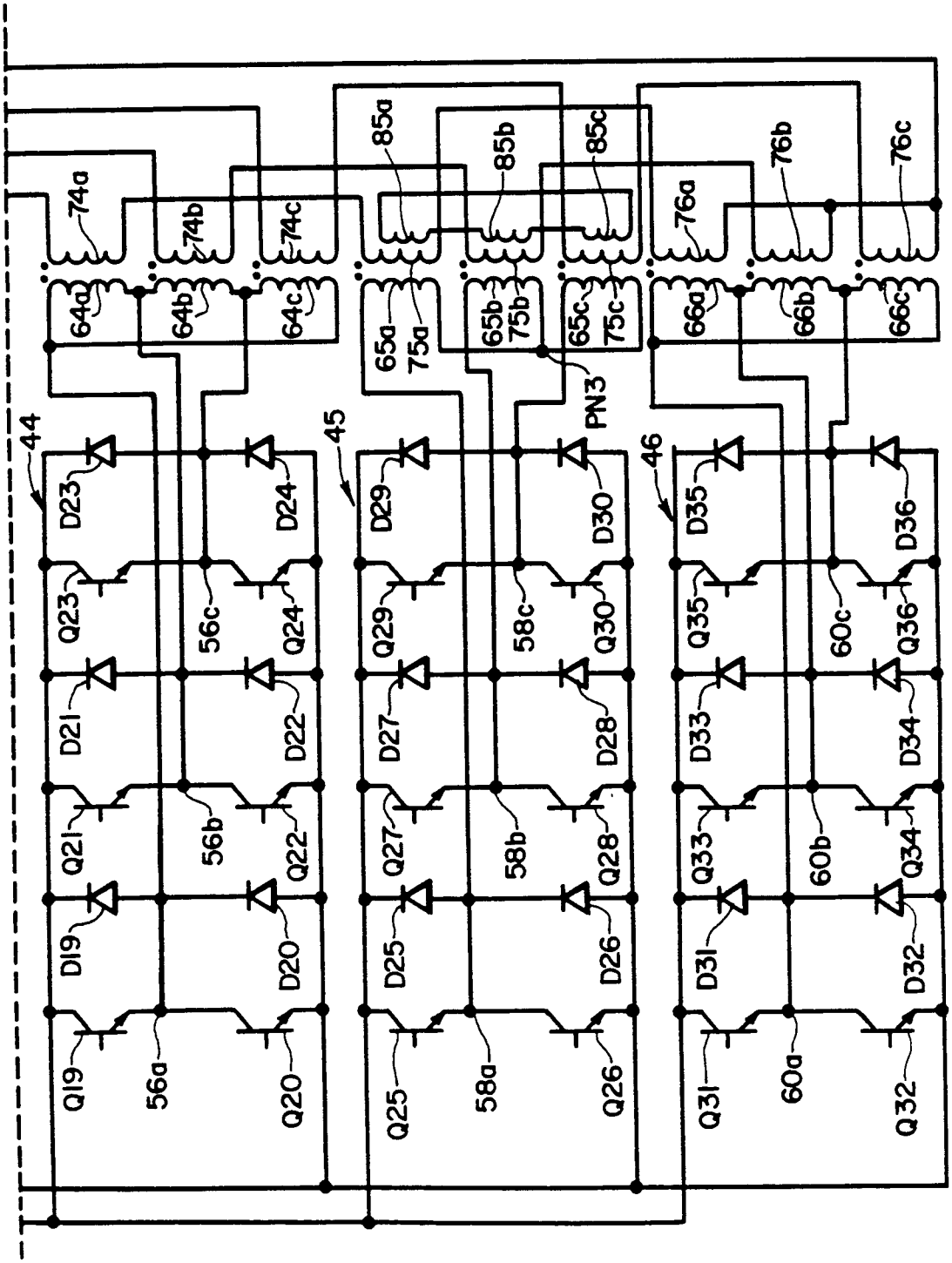

Referring now to FIG. 3, the stepped-waveform inverter 26 includes first through sixth subinverters 41–46 each including first through sixth power switches Q1–Q6, Q7–Q12, Q13–Q18, Q19–Q24, Q25–Q30 and Q31–Q36, respectively. The power switches may be of any suitable type, such as conventional bipolar transistors or insulated gate bipolar transistors. Connected in antiparallel relationship across each power switch Q1–Q36 is a flyback diode D1–D36, respectively. Phase outputs 50a–50c, 52a–52c, 54a–54c, 56a–56c, 58a–58c and 60a–60c of the subinverters 41–46 are coupled to first through sixth sets of primary windings 61a–61c through 66a–66c of a summing transformer 68. The windings of the first, third and fifth sets of primary windings 61a–61c, 63a–63c and 65a–65c are connected together in a wye configuration whereas the windings of the remaining sets 62a–62c, 64a–64c and 66a–66c are connected together in a delta configuration. First through sixth sets of secondary windings 71a–71c through 76a–76c are inductively linked with the sets of primary windings 61a–61c through 66a–66c, respectively. In known fashion, first through sixth sets of stepped polyphase currents are developed by the subinverters 41–46 and flow through the first through sixth sets of primary windings 61a–61c through 66a–66c, in turn inducing first through sixth sets of polyphase voltages in the secondary windings 71a–71c through 76a–76c, respectively. Corresponding windings of the six sets of secondary windings are connected together in series to form three series-connected groupings of windings wherein a phase output voltage $V_A$, $V_B$ or $V_C$ is formed across each grouping and is provided on a line 28a, 28b or 28c to the filter 30. More specifically, the windings 71a–76a are connected in series between the line 28a and the neutral line 28n. The windings 71b–76b are coupled between the lines 28b and 28n while the windings 71c–76c are coupled in series between the windings 28c and 28n. Capacitors C1–C3 are coupled between the lines 28a–28c, respectively, and the neutral line 28n.

First, second and third sets of tertiary windings 81a–81c, 83a–83c and 85a–85c are inductively linked with the first, third and fifth sets of secondary windings 71a–71c, 73a–73c and 75a–75, respectively. The tertiary windings of each set 81a–81c, 83a–83c and 85a–85c are connected together in a delta configuration. It can be seen from FIG. 3 that the tertiary windings are inductively linked with summing transformer portions having primary windings connected in a wye configuration.

During operation of the inverter 26, an unbalanced load condition can arise wherein the currents flowing in the lines 28a–28c become unequal. Such an unbalanced load current condition, can, if uncorrected, cause voltages at one or more primary neutral points PN1–PN3 to vary from a neutral voltage, in turn causing the line-to-neutral voltage magnitudes produced in the associated sets of secondary windings 71a–71c, 73a–73c or 75a–75c to become unequal. These voltage magnitudes can be resolved to positive, negative and zero sequence voltage components. The closed tertiary windings present an infinite impedance to the positive and negative sequence voltage component and present a very low impedance to the zero sequence voltage component. The tertiary windings, therefore, effectively short-circuit the zero sequence voltage components which are the only components that contribute to the unbalanced voltage condition. Thus, the unbalanced voltage condition is prevented by the tertiary windings.

It should be noted that the summing transformer 68 illustrated in FIG. 3 need not include six sets of primary, secondary and tertiary windings. Instead, the transformer could comprise two or four sets of primary and secondary windings coupled to two or four subinverters, respectively. In such a case, half of the primary windings would be connected in a wye configuration whereas the remaining half of the primary windings would be connected in a delta configuration. One or two tertiary windings would then be inductively linked with the secondary winding(s) that are inductively linked with the primary windings connected in a wye configuration.

It can be seen that the summing transformer according to the present invention is simple in design and does not require the use of active components for balancing the voltages produced thereby.

I claim:

1. A summing transformer, comprising:
 a first set of primary windings receiving a first set of polyphase currents;
 a second set of primary windings receiving a second set of polyphase currents;
 a first set of N secondary windings inductively linked with the first set of primary windings and developing a first set of secondary polyphase voltages;
 a second set of N secondary windings inductively linked with the second set of primary windings and developing a second set of secondary polyphase voltages, each winding of the second set of secondary windings being coupled in series with a corresponding winding of the first set of secondary winding to form N series-connected pairs of secondary windings across which N output voltages are produced; and
 a set of N tertiary windings inductively linked with one of the first and second sets of N secondary windings, the tertiary windings being connected together in a delta configuration and permitting zero sequence load currents to flow during a period of unbalanced load currents in the N series-connected pairs of secondary windings whereby the output voltages are maintained in a substantially balanced condition during such period.

2. The summing transformer of claim 1, wherein the windings of the first set of primary windings are connected in a wye configuration and the windings of the second set of primary windings are connected in a delta configuration.

3. The summing transformer of claim 2, wherein the set of N tertiary windings are inductively linked with the first set of N secondary windings.

4. The summing transformer of claim 1, further including third and fourth sets of primary windings which receive third and fourth sets of polyphase currents, respectively, and third and fourth sets of secondary windings inductively linked with the third and fourth sets of primary windings, respectively, wherein each winding of the fourth set of N secondary windings is coupled in series with a corresponding winding of the third set of N secondary windings and one of the N series-connected pairs of secondary windings.

5. The summing transformer of claim 4, including a further set of N tertiary windings inductively linked with one of the third and fourth sets of N secondary windings, the further set of N tertiary windings being connected together in a delta configuration.

6. The summing transformer of claim 5, wherein the further set of N tertiary windings are inductively linked with the third set of N secondary windings.

7. The summing transformer of claim 1, further including third through sixth sets of primary windings which receive third through sixth sets of polyphase currents, respectively, and third through sixth sets of N secondary windings inductively linked with the third through sixth sets of primary windings, respectively, wherein corresponding windings of the third through sixth sets of N secondary windings are connected in series with corresponding series-connected pairs of secondary windings.

8. The summing transformer of claim 7, including two further sets of N tertiary windings inductively linked with two of the third through sixth sets of N secondary windings, each further set of N tertiary windings being connected together in a delta configuration.

9. The summing transformer of claim 8, wherein the two further sets of N tertiary windings are inductively linked with the third and fifth sets of N secondary windings.

* * * * *